(12) United States Patent
Lu

(10) Patent No.: US 8,948,389 B2
(45) Date of Patent: Feb. 3, 2015

(54) WIRELESS NETWORK CONNECTION METHOD, WIRELESS NETWORK APPARATUS AND WIRELESS NETWORK ACCESS POINT (AP) APPLYING THE METHOD

(75) Inventor: Tan-Chun Lu, New Taipei (TW)

(73) Assignee: Accton Technology Corporation, Hsinchu (TW)

( * ) Notice: Subject to any disclaimer, the term of this patent is extended or adjusted under 35 U.S.C. 154(b) by 270 days.

(21) Appl. No.: 13/466,141

(22) Filed: May 8, 2012

(65) Prior Publication Data

US 2013/0108047 A1     May 2, 2013

(30) Foreign Application Priority Data

Oct. 28, 2011   (TW) .............................. 100139396 A

(51) Int. Cl.
| | |
|---|---|
| H04K 1/00 | (2006.01) |
| H04W 12/02 | (2009.01) |
| H04W 12/04 | (2009.01) |
| H04W 84/12 | (2009.01) |
| H04W 92/10 | (2009.01) |

(52) U.S. Cl.
CPC .............. *H04W 12/02* (2013.01); *H04W 12/04* (2013.01); *H04W 84/12* (2013.01); *H04W 92/10* (2013.01)
USPC .......................................................... 380/270

(58) Field of Classification Search
CPC ...... H04W 12/02; H04W 12/04; H04W 12/06
USPC .......................................... 380/270; 713/171
See application file for complete search history.

(56) References Cited

U.S. PATENT DOCUMENTS

| | | | |
|---|---|---|---|
| 2006/0083200 A1* | 4/2006 | Emeott et al. ................. | 370/331 |
| 2007/0189321 A1* | 8/2007 | Lee et al. ...................... | 370/445 |
| 2011/0103589 A1* | 5/2011 | Tie et al. ...................... | 380/282 |

* cited by examiner

*Primary Examiner* — Anthony Brown
(74) *Attorney, Agent, or Firm* — CKC & Partners Co., Ltd.

(57) ABSTRACT

A wireless network connection method includes the following steps: a wireless network access point (AP) that receives apparatus identification information of a wireless network apparatus through a wireless network. The wireless network AP generates a temporary encryption key according to the apparatus identification information and AP identification information of the wireless network AP. The wireless network AP encrypts a network transmission key according to the temporary encryption key to generate an encrypted key. The AP identification information and the encrypted key are transmitted to the wireless network apparatus. The wireless network apparatus generates the temporary encryption key according to the apparatus identification information and the received AP identification information. The wireless network apparatus decrypts the encrypted key according to the temporary encryption key to generate the network transmission key. The wireless network apparatus establishes a security connection with the wireless network AP according to the network transmission key.

8 Claims, 2 Drawing Sheets

WIRELESS NETWORK CONNECTION METHOD, WIRELESS NETWORK APPARATUS AND WIRELESS NETWORK ACCESS POINT (AP) APPLYING THE METHOD

RELATED APPLICATIONS

This application claims priority to Taiwan Application Serial Number 100139396, filed Oct. 28, 2011, which is herein incorporated by reference.

BACKGROUND

1. Technical Field

The present invention relates to network connection technology. More particularly, the present invention relates to a wireless network connection is method, a wireless network apparatus and a wireless network access point (AP) applying the method.

2. Description of Related Art

As wireless network technology becomes popular, there are many issues related to security when transmitting data through a wireless network. Hence, many security protocols have been developed, such as Wired Equivalent Privacy (WEP), Wi-Fi Protected Access (WPA), WPA2, etc. In general, if such security protocols are utilized, a security key, such as a WEP Key or a Pre-shared key (PSK), for authentication must be obtained in advance. A security connection can be established after authentication has been successfully performed. However, users have to input security keys through an input device, and this is a confusing process.

SUMMARY

According to one embodiment of this invention, a wireless network connection method is provided to generate a temporary encryption key according to identification information of a wireless network apparatus and that of a wireless network AP, and to encrypt a network transmission key using the temporary encryption key. The network transmission key is utilized for establishing a security connection between the wireless network apparatus and the wireless network AP. The wireless network connection method includes the following steps:

(a) a wireless network access point (AP) receives apparatus identification information of a wireless network apparatus from the wireless network apparatus through a wireless network;

(b) the wireless network AP generates a temporary encryption key according to the apparatus identification information and AP identification information of the wireless network AP;

(c) the wireless network AP encrypts a network transmission key according to the temporary encryption key to generate an encrypted key;

(d) the AP identification information and the encrypted key are transmitted to the wireless network apparatus;

(e) the wireless network apparatus generates the temporary encryption key according to the apparatus identification information and the received AP identification information;

(f) the wireless network apparatus decrypts the encrypted key according to the temporary encryption key to generate the network transmission key; and (g) the wireless network apparatus to establish a security connection with the wireless network AP according to the network transmission key through the wireless network.

According to another embodiment of this invention, a wireless network apparatus is provided. The wireless network apparatus includes a wireless network card and a processing unit electrically connected to each other. The wireless network card builds a connection to a wireless network. The processing unit includes an information transmitting module, a key generating module, a key decryption module and a security-connection establishing module. The information transmitting module transmits apparatus identification information of the wireless network apparatus to a wireless network AP through the wireless network, and receives AP identification information of the wireless network AP and an encrypted key from the wireless network AP through the wireless network. The wireless network AP generates a temporary encryption key according to apparatus identification information of the wireless network apparatus and the AP identification information. The wireless AP encrypts a network transmission key according to the temporary encryption key to generate the encrypted key. The key generating module generates the temporary encryption key according to the apparatus identification information and the received AP identification information. The key decryption module decrypts the encrypted key according to the temporary encryption key to generate the network transmission key. The security-connection establishing module establishes a security connection to the wireless network AP according to the network transmission key through the wireless network.

According to still another embodiment of this invention, a wireless network AP is provided. The wireless network AP includes a wireless network card and a processing unit which are electrically connected to each other. The wireless network card builds a connection with a wireless network. The processing unit includes an information receiving module, a key generating module, a key encryption module, an information transmitting module and a security-connection establishing module. The information receiving module receives apparatus identification information of a wireless network apparatus from the wireless network apparatus through the wireless network. The key generating module generates a temporary encryption key according to the apparatus identification information and the AP identification information of the wireless network AP. The key encryption module encrypts a network transmission key according to the temporary encryption key to generate an encrypted key. The information transmitting module transmits the AP identification information and the encrypted key to the wireless network apparatus. Subsequently, the wireless network apparatus decrypts the encrypted key according to the temporary encryption key to generate the network transmission key. The security-connection establishing module establishes a security connection with the wireless network apparatus according to the network transmission key.

These and other features, aspects, and advantages of the present invention will become better understood with reference to the following description and appended claims. It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
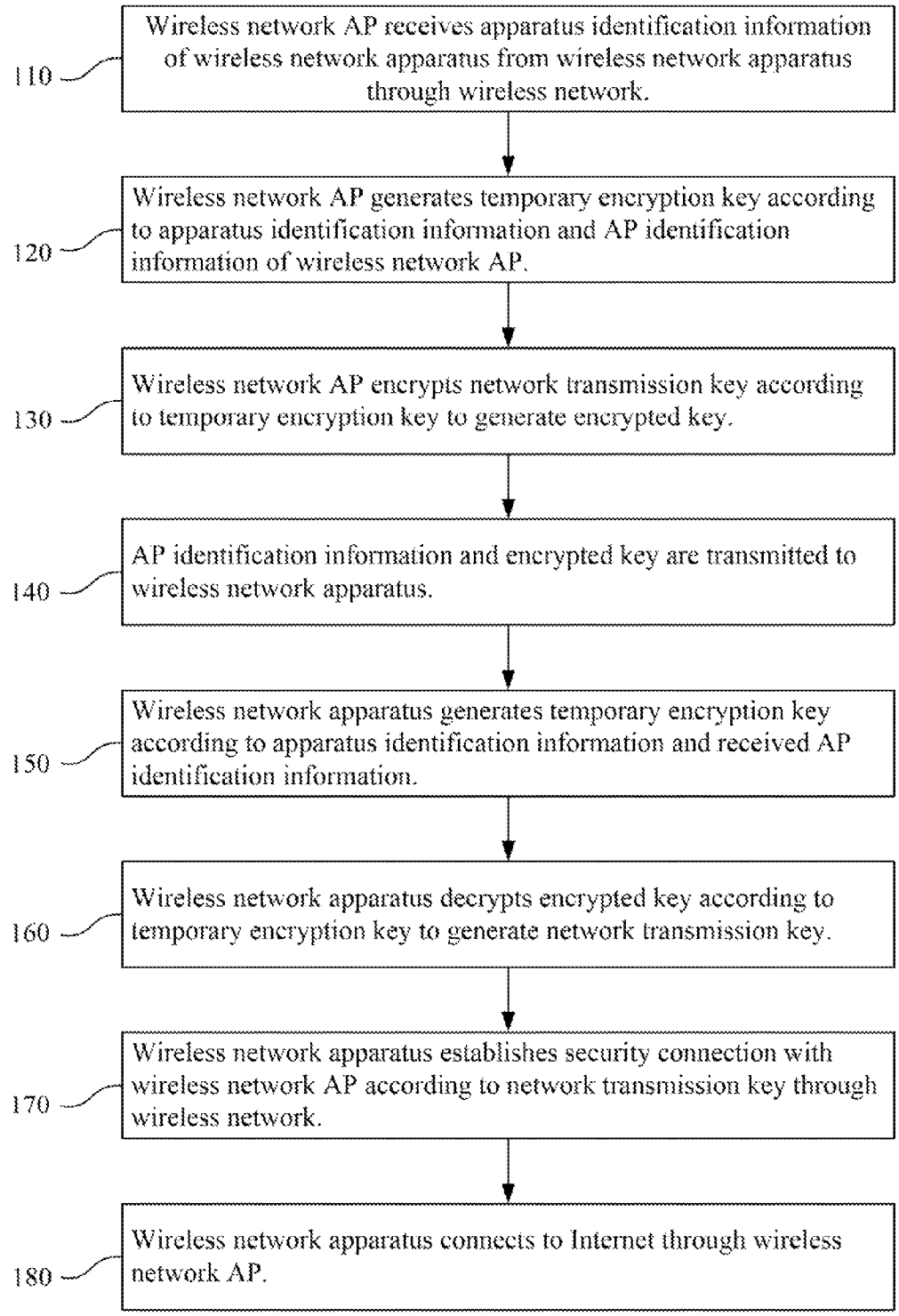
FIG. 1 is a flow diagram of a wireless network connection method according to one embodiment of this invention.

Reference will now be made in detail to the present embodiments of the invention, examples of which are illustrated in the accompanying drawings. Wherever possible, the same reference numbers are used in the drawings and the description to refer to the same or like parts.

Referring to FIG. 1, a flow diagram will be described that illustrates a wireless network connection method according to one embodiment of this invention. In the wireless network connection method, a temporary encryption key is generated according to identification information of a wireless network apparatus and that of a wireless network AP, and a network transmission key, which is utilized for establishing a security connection between the wireless network apparatus and the wireless network AP, is encrypted with the temporary encryption key. The wireless network connection method may take the form of a computer program product stored on a computer-readable storage medium having computer-readable instructions embodied in the medium. Any suitable storage medium may be used including non-volatile memory such as read only memory (ROM), programmable read only memory (PROM), erasable programmable read only memory (EPROM), and electrically erasable programmable read only memory (EEPROM) devices; volatile memory such as static random access memory (SRAM), dynamic random access memory (DRAM), and double data rate random access memory (DDR-RAM); optical storage devices such as compact disc read only memories (CD-ROMs) and digital versatile disc read only memories (DVD-ROMs); and magnetic storage devices such as hard disk drives (HDD) and floppy disk drives.

The routine 100 of the wireless network connection method starts at operation 110, where a wireless network access point (AP) receives apparatus identification information of a wireless network apparatus from the wireless network apparatus through a wireless network. The apparatus identification information of the wireless network apparatus may include a media access control (MAC) address of the wireless network apparatus, a serial number (SN) of the wireless network apparatus, a product ID of the wireless network apparatus or any other type of identification information of the wireless network apparatus.

In one embodiment of this invention, before operation 110 is performed, the wireless network AP may continuously broadcast data (for example, a beacon packet) through the wireless network, such that the wireless network AP can be detected by the wireless network apparatus. Subsequently, the wireless network apparatus may transmit its apparatus identification information to the detected wireless network AP for performing operation 110. In another embodiment of this invention, the wireless network apparatus may continuously transmit or broadcast its apparatus identification information, such that the wireless network AP can receive the transmitted or broadcasted apparatus identification information at operation 110. In some embodiments, the apparatus identification information of the wireless network apparatus may be embedded into a probe request frame or any other type of frame for transmitting to the wireless network AP, such that the reception of the apparatus identification information at operation 110 can be performed. For example, the wireless network apparatus may utilize a specific field of a probe request frame to notify the wireless network AP that the wireless network apparatus can support the routine 100 of the wireless network connection method. Moreover, the wireless network apparatus may utilize at least one identification-related field of a probe request frame to inform the wireless network AP of its apparatus identification information (for example, its MAC address, SN, product ID or any other identification information). In other embodiments of this invention, operation 110 can be triggered in different ways, which should not be limited in this disclosure.

The routine 100 continues to operation 120, where the wireless network AP generates a temporary encryption key according to the received apparatus identification information and AP identification information of the wireless network AP. The AP identification information of the wireless network AP may include a MAC address of the wireless network AP, an SN of the wireless network AP, a product ID of the wireless network AP or any other type of identification information of the wireless network AP. In one embodiment of operation 120, the wireless network AP may take the apparatus identification information of the wireless network apparatus and the AP identification information as parameters of a function for calculating the temporary encryption key. Such a function may be a function of a secure hash algorithm (SHA) or any other algorithm. In other embodiments, other functions or methods may be utilized to generate the temporary encryption key, which should not be limited in this disclosure.

From operation 120, the routine 100 continues to operation 130, where the wireless network AP encrypts a network transmission key according to the temporary encryption key to generate an encrypted key. In one embodiment of this invention, the wireless network AP may perform an XOR operation with respect to the network transmission key and the temporary encryption key to generate the encrypted key at operation 130. In other embodiments, other encryption methods can be utilized for encryption at operation 130, which should not be limited in this disclosure. In some embodiments, the network transmission key may be a Pre-shared key or a Wired Equivalent Privacy (WEP) key. In other embodiments, the network transmission key may be any other key pre-stored in the wireless network AP, which should not be limited in this disclosure.

In subsequence, the routine 100 continues to operation 140, where the wireless network AP transmits the AP identification information and the encrypted key to the wireless network apparatus. In one embodiment of this invention, the wireless network AP may utilize a probe response frame to transmit the AP identification information and the encrypted key to the wireless network apparatus. For example, the wireless network AP may utilize at least one identification-related field of a probe response frame to inform the wireless network apparatus of its AP identification information (for example, its MAC address, SN, product ID or any other identification information). Furthermore, a specific field of a probe response frame may be utilized to carry the encrypted key. In other embodiments, other methods may be utilized to transmit the AP identification information and the encrypted key to the wireless network apparatus at operation 140, which should not be limited in this disclosure.

The routine 100 continues to operation 150, where the wireless network apparatus generates the temporary encryption key according to its apparatus identification information and the received AP identification information. The method or function to generate the temporary encryption key is the same as that at operation 120. As a result, the temporary encryption key generated at operation 150 is the same as that generated at operation 120. However, it is pointed out that for obvious reasons, the apparatus identification information is not transmitted at operation 150 from the wireless network AP.

Subsequently, the routine 100 continues to operation 160, where the wireless network apparatus decrypts the encrypted key according to the temporary encryption key to generate the network transmission key. In one embodiment of this invention, if an XOR operation is utilized for encryption at operation 130, the encrypted key and the temporary encryption key may be processed with an XOR operation for generating the network transmission key at operation 160. In other embodiments, if another method is utilized for encryption at operation 130, a corresponding decryption method may be utilized at operation 160, which should not be limited in this disclosure.

From operation 160, the routine 100 continues to operation 170, where the wireless network apparatus establishes a security connection with the wireless network AP according to the decrypted network transmission key through the wireless network. In one embodiment of this invention, Wi-Fi Protected Access (WPA), WPA2 or any other protocol can be utilized for establishing a security connection at operation 170. In some embodiments, if WPA-PSK (Pre-Shared Key) or WPA2-PSK is utilized, a 4-way handshaking can be utilized for establishing a security connection at operation 170. Therefore, identification information of the wireless network apparatus and the wireless network AP are not transmitted at the same time at operation 120 or operation 150 for the security connection. As a result, in some embodiments of this invention, even if operation 120 and operation 150 are performed before a 4-way handshaking for a security connection, an apparatus other than the wireless network apparatus or the wireless network AP can not generate the temporary encryption key easily. In other words, even if an apparatus other than the wireless network apparatus or the wireless network AP were to receive the encrypted key, the encrypted key could not be decrypted easily. Hence, the network transmission key can be exchanged more safely.

After the security connection is established at operation 170, the routine 100 may continue to operation 180, where the wireless network apparatus connects to the Internet through the security connection with the wireless network AP. In some embodiments, account information of the wireless network apparatus may be verified to determine if the wireless network apparatus has the authority to access the Internet. In subsequence, if the wireless network apparatus has the authority to access the Internet, which again may be determined using the account information of the wireless network apparatus, operation 180 may be performed. Hence, the wireless network apparatus can connect to the Internet in a secure manner through the wireless network. In some embodiments, if operation 110 is performed automatically by the wireless network apparatus or the wireless network AP, the security connection between the wireless network apparatus and the wireless network AP can be established in a fully automatic manner using the routine 100, and as a result, convenience is provided to users.

In one embodiment of this invention, the wireless network AP may randomly generate an AP random code, and embed the AP random code into its AP identification information. The AP random code can be generated when the apparatus identification information of the wireless network apparatus is received at operation 110. In other embodiments, the wireless network AP can randomly generate the AP random code under any other condition, which should not be limited in this disclosure. In subsequence, the wireless network AP generates the temporary encryption key according to the apparatus identification information and the AP random code embedded in its AP identification information at operation 120. In some embodiments of this invention, an AP temporary code field may be defined in the probe response frame for transmitting the AP identification information, and the AP random code is stored in the AP temporary code field for transmission at operation 140. In subsequence, the wireless network apparatus may generate the temporary encryption key according to the apparatus identification information and the AP random code of the received AP identification information at operation 150. Therefore, if several wireless network apparatuses connect to the same wireless network AP, different AP random codes may be provided for generating temporary encryption keys, which can provide better security.

In another embodiment of this invention, the wireless network apparatus may randomly generate an apparatus random code, and embed the apparatus random code into its apparatus identification information. In one embodiment of this invention, the wireless network apparatus may randomly generate an apparatus random code when a wireless network AP is detected. An apparatus temporary code field may be defined in the probe request frame for transmitting or broadcasting the apparatus identification information, and the apparatus random code is stored in the apparatus temporary code field for transmission at operation 110. In other embodiments, the wireless network apparatus can randomly generate the apparatus random code under any other condition, which should not be limited in this disclosure. Hence, the wireless network AP may generate the temporary encryption key according to the apparatus random code embedded in the apparatus identification information and the AP identification information at operation 120. Similarly, the wireless network apparatus may generate the temporary encryption key according to the apparatus random code embedded in the apparatus identification information and the received AP identification information. Therefore, if the wireless network apparatus connects to several wireless network APs, different apparatus random codes may be provided for generating temporary encryption keys, which can provide better security.

In some embodiments, a connection can be established automatically in the routine 100. Hence, in the routine 100, a beacon frame or a probe request frame may be utilized to verify if a wireless network apparatus or a wireless network AP supports the routine 100. For example, if an AP identification of a wireless network AP is carried in a beacon frame, which is received by the wireless network apparatus, or an apparatus identification of a wireless network apparatus is carried in a probe request frame, which is received by the wireless network AP, such an identification may be verified for support verification of the routine 100. If the wireless network apparatus and the wireless network AP support the routine 100, operation 110 to operation 170 may be performed automatically for establishing a security connection. In another embodiment of this invention, a user can trigger operation 110 through a user interface of a wireless network apparatus or that of, a wireless network AP. In other embodiments, other methods may be utilized to trigger operation 110 to establish a security connection, which should not be limited in this disclosure. Therefore, a user does not have to input any key to establish a security connection between the wireless network apparatus and the wireless network AP automatically, such that convenience is provided to the user.

Figure 2:
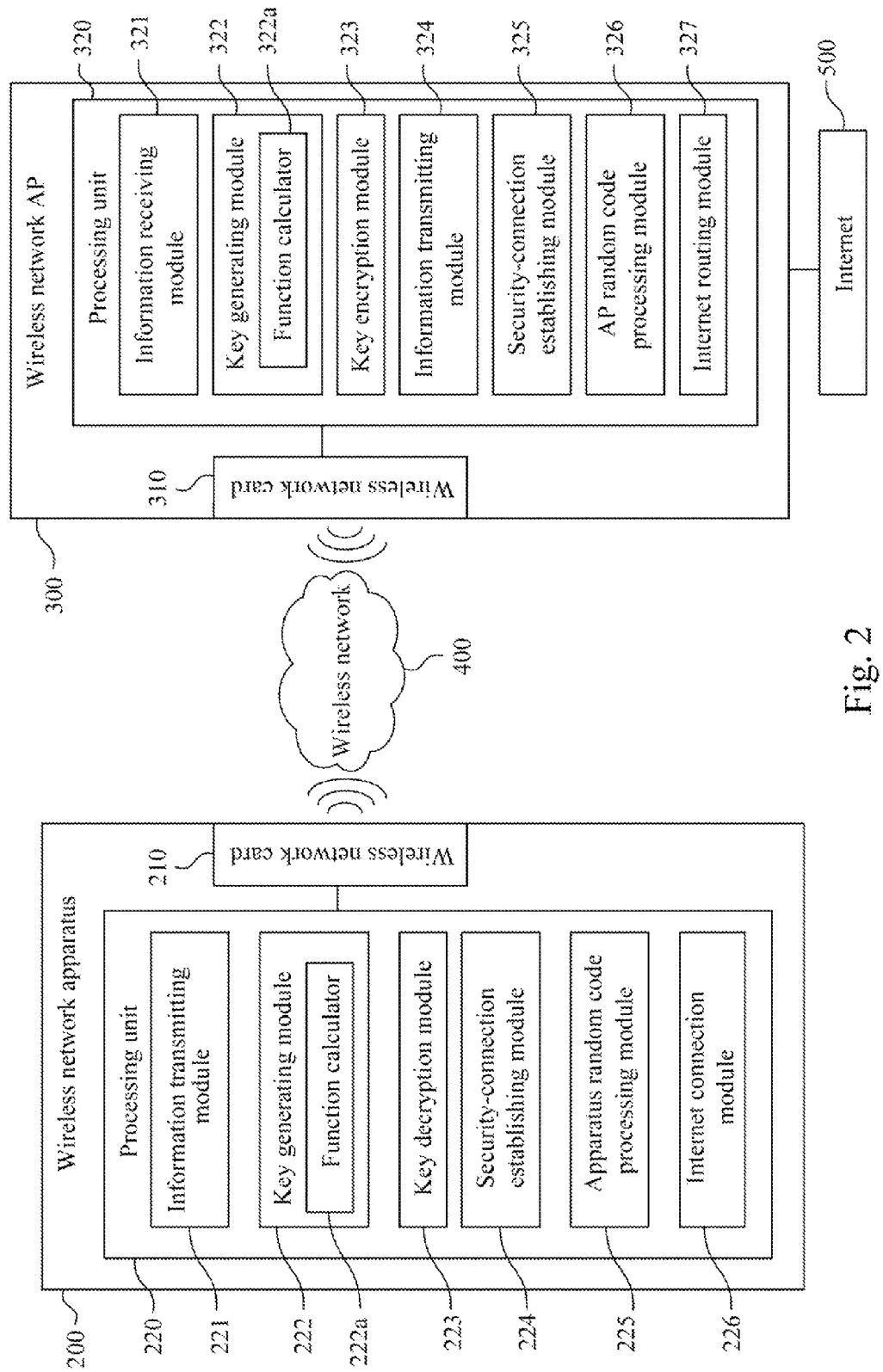
FIG. 2 is a block diagram illustrating a wireless network system according to an embodiment of this invention.

Referring to FIG. 2, a block diagram will be described that illustrates a wireless network system according to an embodiment of this invention. The wireless network system generates a temporary encryption key according to identification information of a wireless network apparatus and that of a wireless network AP, and using the temporary encryption key, encrypts a network transmission key which is utilized for establishing a security connection between the wireless network apparatus and the wireless network AP.

The wireless network system includes a wireless network apparatus 200 and a wireless network AP 300. The wireless network apparatus 200 includes a wireless network card 210 and a processing unit 220 electrically connected to each other. The wireless network card 210 builds a connection to a wireless network 400 utilizing IEEE 802.11 series, Wi-Fi®, ZigBee®, Worldwide Interoperability for Microwave Access (WiMAX®), Long Term Evolution (LTE®) or any other wireless network protocol.

The processing unit 220 of the wireless network apparatus 200 includes an information transmitting module 221, a key generating module 222, a key decryption module 223 and a security-connection establishing module 224. The information transmitting module 221 transmits apparatus identification information of the wireless network apparatus 200 to the wireless network AP 300 through the wireless network 400. The apparatus identification information of the wireless network apparatus 200 may include a MAC address, an SN, a product ID or any other type of identification information of the wireless network apparatus 200. In subsequence, the wireless network AP 300 generates a temporary encryption key according to its AP identification information and the received apparatus identification information of the wireless network apparatus 200. The wireless network AP 300 subsequently encrypts a network transmission key according to the temporary encryption key to generate an encrypted key. Next, the wireless network apparatus 200 receives the AP identification information of the wireless network AP 300 and the encrypted key from the wireless network AP 300 through the wireless network 400. The AP identification information of the wireless network AP 300 may include a MAC address, an SN, a product ID or any other type of identification information of the wireless network AP 300.

The key generating module 222 generates the temporary encryption key according to the apparatus identification information of the wireless network apparatus 200 and the received AP identification information. The key generating module 222 generates the temporary encryption key utilizing the same method as the wireless network AP 300. In one embodiment of this invention, the key generating module 222 may include a function calculator 222a for calculating the temporary encryption key utilizing a function with parameters of the apparatus identification information and the received AP identification information. In some embodiments, the function calculator 222a utilizes a function of SHA or any other type of function, which should not be limited in this disclosure.

The key decryption module 223 decrypts the encrypted key according to the temporary encryption key to generate the network transmission key. The key decryption module 223 utilizes a decryption method corresponding to the encryption method utilized by the wireless network AP 300.

Subsequently, the security-connection establishing module 224 establishes a security connection to the wireless network AP 300 according to the network transmission key through the wireless network 400. In some embodiments, the security-connection establishing module 224 may utilize WPA-PSK, WPA2-PSK or any other method for establishing a security connection. Therefore, identification information of the wireless network apparatus 200 and that of the wireless network AP 300 are not transmitted at the same time (or called in the same packet). As a result, an apparatus other than the wireless network apparatus 200 or the wireless network AP 300 can not generate the temporary encryption key easily. In other words, even if an apparatus other than the wireless network apparatus 200 or the wireless network AP 300 were to receive the encrypted key, the encrypted key could not be decrypted easily. Hence, the network transmission key can be exchanged more safely. Furthermore, in some embodiments, the wireless network apparatus 200 and the wireless network AP 300 can establish a security connection therebetween automatically through such operations.

In addition, the processing unit 220 of the wireless network apparatus 200 may further include an Internet connection module 226. After the wireless network apparatus 200 establishes a security connection with the wireless network AP 300, the Internet connection module 226 can connect to the Internet through the security connection. Hence, the wireless network apparatus 200 can connect to the Internet in a secure manner.

In one embodiment of this invention, the wireless network apparatus 200 may randomly generate an apparatus random code to embed into its apparatus identification information. Hence, the processing unit 220 of the wireless network apparatus 200 may further include an apparatus random code processing module 225. The apparatus random code processing module 225 may randomly generate an apparatus random code and embed the apparatus random code into the apparatus identification information for transmission by the information transmitting module 221. In one embodiment of this invention, the apparatus random code processing module 225 may be triggered to randomly generate an apparatus random code when the wireless network AP is detected. In another embodiment of this invention, the apparatus random code processing module 225 may be triggered to randomly generate an apparatus random code before the information transmitting module 221 transmits or broadcasts its apparatus identification information. In other embodiments, the apparatus random code processing module 225 can randomly generate the apparatus random code under any other condition, which should not be limited in this disclosure. Hence, the wireless network AP 300 may generate the temporary encryption key according to the apparatus random code embedded in the apparatus identification information and its AP identification information. Similarly, the key generating module 222 may generate the temporary encryption key according to the apparatus random code embedded in the apparatus identification information and the received AP identification information. Therefore, if the wireless network apparatus 200 connects to several different wireless network APs, different apparatus random codes may be provided for generating temporary encryption keys, which can provide better security.

The wireless network system will now be described from the point of view of the wireless network AP 300. The wireless network AP 300 includes a wireless network card 310 and a processing unit 320 which are electrically connected to each other. The wireless network card 310 builds a connection with the wireless network 400. The wireless network card 310 builds a connection to the wireless network 400 utilizing IEEE 802.11 series, Wi-Fi®, ZigBee®, Worldwide Interoperability for Microwave Access (WiMAX®), Long Term Evolution (LTE®) or any other wireless network protocol.

The processing unit 320 of the wireless network AP 300 includes an information receiving module 321, a key generating module 322, a key encryption module 323, an information transmitting module 324 and a security-connection establishing module 325. The information receiving module 321 receives apparatus identification information of a wireless network apparatus 200 from the wireless network apparatus 200 through the wireless network 400.

The key generating module 322 generates a temporary encryption key according to the received apparatus identification information and AP identification information of the wireless network AP 300. In one embodiment of this invention, the key generating module 322 may include a function calculator 322a for calculating the temporary encryption key utilizing a function with parameters of the received apparatus identification information and the AP identification information.

The key encryption module 323 encrypts a network transmission key according to the temporary encryption key to generate an encrypted key. In one embodiment of this invention, the key encryption module 323 can perform an XOR operation with respect to the network transmission key and the temporary encryption key to generate the encrypted key. In other embodiments, the key encryption module 323 can encrypt with any other method, which should not be limited in this disclosure.

The information transmitting module 323 transmits the AP identification information and the encrypted key to the wireless network apparatus 200. Subsequently, the wireless network apparatus 200 can generate the temporary encryption key according to its apparatus identification information and the received AP identification information. The wireless network apparatus 200 can utilize a decryption method corresponding to the encryption method utilized by the information transmitting module 323 for generating the network transmission key. In subsequence, the wireless network apparatus 200 can decrypt the encrypted key according to the temporary encryption key to generate the network transmission key.

The security-connection establishing module 325 establishes a security connection with the wireless network apparatus 200 according to the network transmission key through the wireless network 400.

In addition, the processing unit 320 of the wireless network AP 300 may further include an Internet routing module 327 for building a connection to the to Internet 500. Hence, after the wireless network apparatus 200 establishes a security connection with the wireless network AP 300, the Internet routing module 327 may act as a router to route the wireless network apparatus 200 to the Internet 500. Therefore, the wireless network AP 300 can provide a secure route for the wireless network apparatus to connect to the Internet 500.

In one embodiment of this invention, the processing unit 320 of the wireless network AP 300 may further include an AP random code processing module 326 for randomly generating an AP random code and embedding the AP random code into the AP identification information. In some embodiments, the AP random code processing module 326 may randomly generate an AP random code when apparatus information of a wireless network apparatus 200 is received. In other embodiments, the AP random code processing module 326 may randomly generate an AP random code under other conditions, which should not be limited in this disclosure. In subsequence, the key generating module 323 generates the temporary encryption key according to the apparatus identification information and the AP random code embedded in the AP identification information. Similarly, the wireless network apparatus 200 may generate the temporary encryption key according to its apparatus identification information and the AP random code embedded in the AP identification information.

The present invention can achieve many advantages. In particular, a situation in which identification information of a wireless network apparatus and that of a wireless network being transmitted at the same time or in the same packet can be avoided. As a result, in some embodiments of this invention, even if such identification information is transmitted before a 4-way to handshaking for a security connection, an apparatus other than the wireless network apparatus or the wireless network AP can not generate the temporary encryption key easily. In other words, even if an apparatus other than the wireless network apparatus or the wireless network AP were to receive the encrypted key, the encrypted key could not be decrypted easily. Hence, the is network transmission key can be exchanged more safely.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A wireless network connection method comprising:
   (a) utilizing a wireless network access point (AP) to receive apparatus identification information of a wireless network apparatus from the wireless network apparatus through a wireless network;
   (b) utilizing the wireless network AP to generate a temporary encryption key according to the apparatus identification information and AP identification information of the wireless network AP;
   (c) utilizing the wireless network AP to encrypt a network transmission key according to the temporary encryption key to generate an encrypted key;
   (d) transmitting the AP identification information and the encrypted key to the wireless network apparatus;
   (e) utilizing the wireless network apparatus to generate the temporary encryption key according to the apparatus identification information and the received AP identification information;
   (f) utilizing the wireless network apparatus to decrypt the encrypted key according to the temporary encryption key to generate the network transmission key; and
   (g) utilizing the wireless network apparatus to establish a security connection with the wireless network AP according to the network transmission key through the wireless network;
   wherein wireless network connection method further comprising:
   utilizing the wireless network AP to randomly generate an AP random code, and to embed the AP random code into the AP identification information,
   wherein the wireless network AP generates the temporary encryption key according to the apparatus identification information and the AP random code embedded in the AP identification information at operation (b), and
   wherein the wireless network apparatus generates the temporary encryption key according to the apparatus identification information and the AP random code of the received AP identification information at operation (e).

2. A wireless network connection method comprising:
   (a) utilizing a wireless network access point (AP) to receive apparatus identification information of a wireless network apparatus from the wireless network apparatus through a wireless network;

(b) utilizing the wireless network AP to generate a temporary encryption key according to the apparatus identification information and AP identification information of the wireless network AP;

(c) utilizing the wireless network AP to encrypt a network transmission key according to the temporary encryption key to generate an encrypted key;

(d) transmitting the AP identification information and the encrypted key to the wireless network apparatus;

(e) utilizing the wireless network apparatus to generate the temporary encryption key according to the apparatus identification information and the received AP identification information;

(f) utilizing the wireless network apparatus to decrypt the encrypted key according to the temporary encryption key to generate the network transmission key;

(g) utilizing the wireless network apparatus to establish a security connection with the wireless network AP according to the network transmission key through the wireless network; and utilizing the wireless network apparatus randomly generate an apparatus random code, and to embed the apparatus random code into the apparatus identification information, wherein the wireless network AP generates the temporary encryption key according to the apparatus random code embedded in the apparatus identification information and the AP identification information at operation (b), and wherein the wireless network apparatus generates the temporary encryption key according to the apparatus random code embedded in the apparatus identification information and the received AP identification information.

3. The wireless network connection method of claim 1, wherein:

operation (b) further comprises utilizing the wireless network AP to take the apparatus identification information and the AP identification information as parameters of a function for calculating the temporary encryption key; and operation (e) further comprises utilizing the wireless network apparatus to take the apparatus identification information and the received AP identification information as parameters of the function for calculating the temporary encryption key.

4. The wireless network connection method of claim 1, wherein:

the apparatus identification information of the wireless network apparatus is carried by a probe request frame at operation (a); and the AP identification information and the encrypted key are carried by a probe response frame at operation (d).

5. The wireless network connection method of claim 1, wherein the security connection is established through a 4-way handshaking at operation (g), and operations (a) to (f) are executed before the 4-way handshaking.

6. A wireless network apparatus for building a connection with a wireless network AP, wherein the wireless network AP stores AP identification information of the wireless network AP and a network transmission key, the wireless network AP generates a temporary encryption key according to apparatus identification information of the wireless network apparatus and the AP identification information, and the wireless network AP encrypts the network transmission key according to the temporary encryption key to generate an encrypted key, and the wireless network apparatus comprises:

a wireless network card for building a connection to a wireless network; and a processing unit electrically connected to the wireless network card, wherein the processing unit comprises:

an information transmitting module for transmitting the apparatus identification information of the wireless network apparatus to the wireless network AP through the wireless network, and receiving the AP identification information of the wireless network AP and the encrypted key from the wireless network AP through the wireless network;

a key generating module for generating the temporary encryption key according to the apparatus identification information and the received AP identification information;

a key decryption module for decrypting the encrypted key according to the temporary encryption key to generate the network transmission key; and a security-connection establishing module for establishing a security connection to the wireless network AP according to the network transmission key through the wireless network;

wherein the wireless network AP generates the temporary encryption key according to an apparatus random code and the AP identification information, and the processing unit further comprises:

an apparatus random code processing module for randomly generating the apparatus random code, embedding the apparatus random code into the apparatus identification information, and transmitting the apparatus identification information to the wireless network AP for generating the temporary encryption key, wherein the key generating module generates the temporary encryption key according to the apparatus random code embedded in the apparatus identification information and the received AP identification information.

7. The wireless network apparatus of claim 6, wherein the key generating module comprises:

a function calculator for calculating the temporary encryption key utilizing a function with parameters of the apparatus identification information and the received AP identification information.

8. A wireless network AP for building a connection with a wireless network apparatus, wherein the wireless network apparatus stores apparatus identification information, the wireless network AP stores AP identification information, the wireless network apparatus generates a temporary encryption key according to the apparatus identification information and the AP identification information, the wireless network apparatus decrypts an encrypted key according to the temporary encryption key to generate a network transmission key, and the wireless network AP comprises:

a wireless network card for building a connection with a wireless network; and a processing unit electrically connected to the wireless network card, wherein the processing unit comprises:

an information receiving module for receiving the apparatus identification information of the wireless network apparatus from the wireless network apparatus through the wireless network;

a key generating module for generating the temporary encryption key according to the apparatus identification information and the AP identification information of the wireless network AP;

a key encryption module for encrypting the network transmission key according to the temporary encryption key to generate the encrypted key;
an information transmitting module for transmitting the AP identification information and the encrypted key to the wireless network apparatus; and
a security-connection establishing module for establishing a security connection with the wireless network apparatus according to the network transmission key;
wherein the wireless network apparatus generates the temporary encryption key according to the apparatus identification information and an AP random code, and the processing unit further comprises:
an AP random code processing module for randomly generating the AP random code and embedding the AP random code into the AP identification information,
wherein the key generating module generates the temporary encryption key according to the apparatus identification information and the AP random code embedded in the AP identification information.

* * * * *